J. W. CLOSE.
Dies for Welding Railroad-Frog Points.
No. 155,497. Patented Sept. 29, 1874.
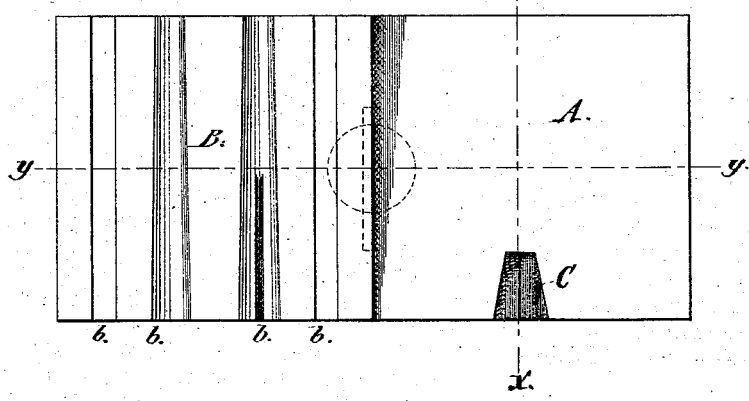
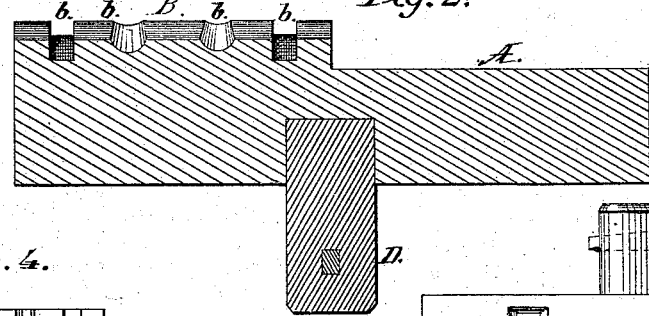
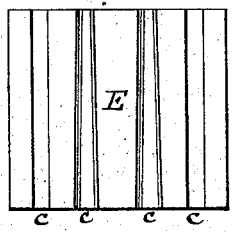
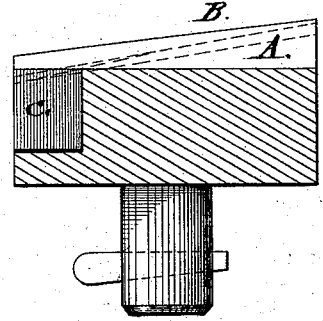
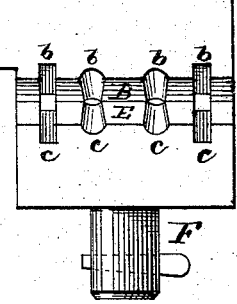
Witnesses:
Inventor:

UNITED STATES PATENT OFFICE.

JOHN W. CLOSE, OF BUFFALO, NEW YORK, ASSIGNOR OF ONE-HALF HIS RIGHT TO CHARLES B. SMITH, OF SAME PLACE.

IMPROVEMENT IN DIES FOR WELDING RAILROAD-FROG POINTS.

Specification forming part of Letters Patent No. 155,497, dated September 29, 1874; application filed March 6, 1874.

*To all whom it may concern:*

Be it known that I, JOHN W. CLOSE, of the city of Buffalo, in the county of Erie and State of New York, have invented certain new and useful Improvements in Dies and Swage-Blocks for Welding Railroad-Frog Points; and I do hereby declare the following to be a full, clear, and exact description of the invention, such as will enable others skilled in the art to which it pertains to make and use it, reference being had to the accompanying drawings, which form part of this specification.

The object of my invention is to furnish a swage-block and die with which to weld together cast-steel rails for the purpose of forming railway-frog points. It consists in making the swage-block and die with inclined faces, into which grooves are sunk, shaped to conform to the rails when laid upon their sides. These grooves run in the direction of the incline—that is, from the front to the back of the die or swage-block, and are so arranged with respect to their depth, which is greater at the front than the back, that when the point to be welded is laid upon the block every part of the bottom rail rests upon a solid base, and the die in descending strikes fairly and solidly upon the upper rail, alike upon every part that lies under it. The invention further consists in providing the front of the flat surface or face of the swage-block with a recess to receive the point while the flanges of the rails are being welded together.

Figure 1 is a plan of the swage-block or under die. Fig. 2 is a longitudinal section of the same. Fig. 3 is a transverse section on line $x$ $x$. Fig. 4 is a plan of the upper die. Fig. 5 shows the two dies placed together.

A represents the flat face of the swage-block or under die. B is the inclined face of the same. $b\ b\ b\ b$ are two sets of grooves sunk in the inclined face B to receive the point of the frog. These grooves are the reverse of each other, so that both sides of the point may be subjected to the stroke of the hammer or upper die. They are also shaped to accommodate the several parts of the rail—the head, web, and flange—in order that each may rest solidly on the block. E is the face of the upper die, which is inclined like that of the lower, and has corresponding grooves $c\ c\ c\ c$ to fit over the side of the rail. The grooves are deeper at the front of the dies than at the back, as shown in the drawings. This is an essential feature in both the upper and lower die, as it enables the upper side of the point to be brought nearly level with surface of the block or under die, and thus the die in descending strikes the surface of the point its entire width. When the length of the point is so great that the whole of it cannot be welded at the same time, a double set of grooves may be provided, one deeper than the other. In the first the point is welded as far as the width of the dies will permit. It is then transferred to the second and the welding is completed. C is a recess in the front of the flat face of the under die. Into it the extremity of the point is placed bottom side up, after the two rails forming the point have been welded together, and the flanges of the rails are welded to one another. The flat face A of the under die is used to weld the top of the frog-point on. When the two rails are joined together a channel is left between the curved heads of the rails. This is filled up with soft metal, which is welded to the rails in order to give a flat surface to the point.

It is my intention that the dies shall be used in connection with the steam-hammer hydrostatic press or with a common anvil,—in this latter case the welding being done with common hammers. When used with the steam-hammer or hydrostatic press the under die, Fig. 4, is attached to the anvil-block, and the upper die to the piston-rod connection. When used with the common anvil the lower die is placed upon it and the upper is placed upon the upper rail of the point, when it is placed upon the anvil. The strokes of the hammers are then directed upon the upper die. The flat face of the under die is used principally in connection with the common anvil and sledge-hammers, though it can also be used to weld the top of the point on in connection with the steam-hammer.

D and F are the pivots, by means of which the respective dies are attached to the anvil, anvil-block, or the connecting-rod of a steam-hammer or hydrostatic press. When the upper die is used with sledge-hammers the pivot F is omitted.

Having thus described my invention, what I claim as new, and desire to secure by Letters Patent, is—

A pair of improved dies for welding frog-points, having inclined faces B and E, with tapering grooves $b\ b\ b\ b$, &c., and $c\ c\ c\ c$, &c., and the lower die provided with a flat face, A, and recess C, substantially as and for the purpose hereinbefore described and set forth.

In testimony that I claim the foregoing I have hereunto set my hand this 17th day of February, 1874.

JOHN W. CLOSE.

Witnesses:
 WILTON C. DONN,
 J. T. K. PLANT.